No. 831,037. PATENTED SEPT. 18, 1906.
J. CAMPBELL.
ANIMAL TRAP.
APPLICATION FILED MAY 24, 1906.
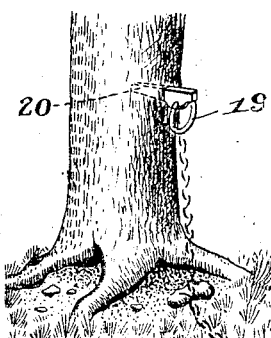
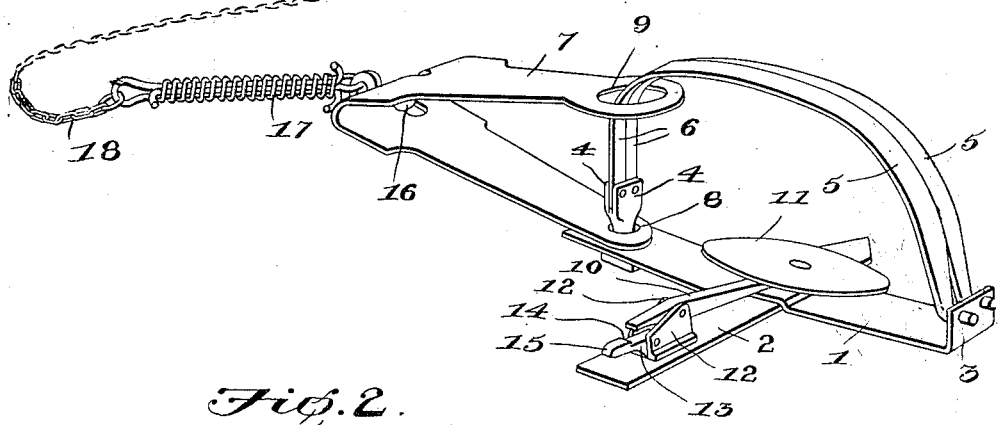
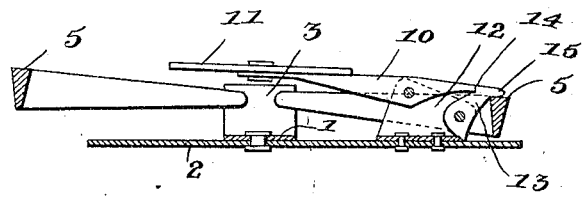
John Campbell,
INVENTOR.
WITNESSES:
By
ATTORNEYS

UNITED STATES PATENT OFFICE.

JOHN CAMPBELL, OF ST. CROIX FALLS, WISCONSIN, ASSIGNOR OF ONE-HALF TO FRED CHRISTIE, OF ST. CROIX FALLS, WISCONSIN.

ANIMAL-TRAP.

No. 831,037.  Specification of Letters Patent.  Patented Sept. 18, 1906.

Application filed May 24, 1906. Serial No. 318,567.

*To all whom it may concern:*

Be it known that I, JOHN CAMPBELL, a citizen of the United States, residing at St. Croix Falls, in the county of Polk and State of Wisconsin, have invented a new and useful Animal-Trap, of which the following is a specification.

This invention has relation to animal-traps; and it consists in the novel construction and arrangement of its parts, as hereinafter shown and described.

The object of the invention is to provide an animal-trap of simple construction having its parts so arranged as to be positive in its operation. The spring for operating the trap is so positioned as to avoid the possibility of throwing the leg of the animal out of the trap when the same is sprung.

The trap is also provided with a trip-and-trigger mechanism of special construction, as will be hereinafter explained.

In the accompanying drawings, Figure 1 is a perspective view of the trap. Fig. 2 is a transverse sectional view of the same, showing the jaws opened.

The trap consists of the base-piece 1, to which is affixed the transversely-extending piece 2. The said pieces are adapted to rest upon the surface of the ground. One end of the base-piece 1 is upturned in the form of a flange 3, and the lug 4 is attached to the said piece 1 near the opposite end thereof. The jaws 5 5 are pivoted at their ends to the lug 4 and to the flange 3. The said jaws 5 are upwardly bowed, as illustrated in the drawings, and have the substantially vertical portions 6, which are located above the lug 4. The spring 7 consists of a strip of metal bent back upon itself so that its ends are opposite each other. The tension of the said spring is such as to have a tendency to keep the ends thereof apart.

One end of the spring is provided with an eye 8, which passes loosely around the lug 4, and the other end of the said spring 7 is provided with an eye 9, which is adapted to receive and move in a vertical direction along the straight portions 6 6 of the jaws 5. The shank 10 of the trip 11 is pivoted between the lugs 12, said lugs being located upon the transversely-extending base portion 2. The trigger 13 is also pivoted between the lugs 12. Said trigger is provided in its upper edge with a shoulder-notch 14, which is adapted to receive the end of the trigger-shank 10. The extreme rear end 15 of said trigger 13 extends substantially horizontally and is adapted to receive under it one of the jaws 5.

The eye 16 is swiveled to the spring 7 and is connected to the spring 17, which in turn is connected to the chain 18. Said chain is linked to the ring 19, and said link is provided with a spur 20. To set the trap, it is made fast to a stationary object by driving the spur 20 in the said object. The upper end of the spring 7 is forced down along the vertical sections 6 of the jaws 5 until the eye 9 thereof receives the lug 4, when the jaws 5 may be swung apart and the edge of one jaw passed under the horizontal portion 15 of the trigger 13, and the end of the shank 10 of the trip 11 is brought into engagement with the shoulder 14 of the said trigger. Thus the trip 11 is elevated slightly above the base of the trap and is held in such elevated position by reason of the fact that the tendency of the ends of the spring 7 to separate bears against the lower edges of the jaws 5, one of which in turn bears upwardly against the lower edge of the portion 15 of the trigger 13 and forces the shoulder 14 of the said trigger against the end of the shank 10 of the said trip 11.

When the animal steps upon the trip 11, the opposite end of the shank 10 is elevated above the shoulder 14 of the trigger, and the said trigger may then move upon its pivotal point, which permits the jaws 5 to fly up. The eye 9, passing along the vertical portions 6 of the said jaws, brings the said jaws together positively and with sufficient force to retain the animal. The spring 7 is so arranged with relation to the jaws that in its operation it cannot throw the leg of the animal out of the jaws, and when the trip 11 is stepped upon the trap cannot be sprung without catching the animal. The spring 7 is provided, in connection with the chain 18, with the spring 17 in order to relieve the chain of the sudden jerks and strain incident to the violence of the animal when trapped, and the swiveled connection 16 is provided in order to prevent the chain from becoming twisted or knotted.

Having described my invention, what I claim as new, and desire to secure by Letters Patent, is—

A trap comprising a base, jaws pivotally attached to said base, a spring bent intermediate of its ends and being pivotally attached to said base and having an end engaging said jaws and being provided with an elongated perforation at its bend, a second spring attached by means of a swiveled connection with the first said spring at the elongated perforation thereof, and attaching means connected to the second said spring.

In testimony that I claim the foregoing as my own I have hereto affixed my signature in the presence of two witnesses.

JOHN CAMPBELL.

Witnesses:
A. C. HARGRAVE,
DAN RUSSELL.